United States Patent

Wilson

[15] 3,677,172
[45] July 18, 1972

[54] COOKING RACK-PAN COMBINATION

[72] Inventor: James D. Wilson, Long Beach, Calif.

[73] Assignee: Banner Metals, Inc., Compton, Calif.

[22] Filed: Sept. 2, 1970

[21] Appl. No.: 68,850

Related U.S. Application Data

[63] Continuation-in-part of Ser. No. 853,380, Aug. 27, 1969, abandoned.

[52] U.S. Cl. ................................... 99/347, 99/446, 99/448
[51] Int. Cl. ............................................................A47j 37/10
[58] Field of Search .............................. 99/446, 447–448, 99/375, 400, 408, 425, 345, 347; 107/7 G, 56, 57 A; 211/71, 106, 134, 153, 162, 181; 126/21 A, 281; 108/25–26, 57; 312/330; 280/33.99 S; 220/66, 83

[56] References Cited

UNITED STATES PATENTS

| | | | |
|---|---|---|---|
| 1,769,048 | 7/1930 | Anetsberger et al. | 126/281 |
| 2,762,669 | 9/1956 | Watson | 211/133 X |
| 2,928,681 | 3/1960 | Wilson | 280/33.99 S |
| 2,982,422 | 5/1961 | Asproyerakas | 211/134 |
| 3,111,915 | 11/1963 | Gray | 211/162 X |
| 3,152,698 | 10/1964 | Maddox | 211/162 X |
| 3,462,166 | 8/1969 | Fuhrmann | 280/33.99 S |
| 3,527,360 | 9/1970 | Thielking | 211/126 X |

Primary Examiner—Walter A. Scheel
Assistant Examiner—Arthur O. Henderson
Attorney—Jessup and Beecher

[57] ABSTRACT

An improved rack-pan combination is provided which has particular utility in the industrial cooking of food, such as fish. The combination of the invention includes an improved rack which may be nested with other similar racks, and it includes a plurality of impervious pans, which likewise may be nested with other similar pans, the pans being supported in a stacked relationship on the rack and supporting the food being cooked.

4 Claims, 5 Drawing Figures

Patented July 18, 1972

INVENTOR:
James D. Wilson

ATTORNEYS

Patented July 18, 1972
3,677,172
3 Sheets-Sheet 2
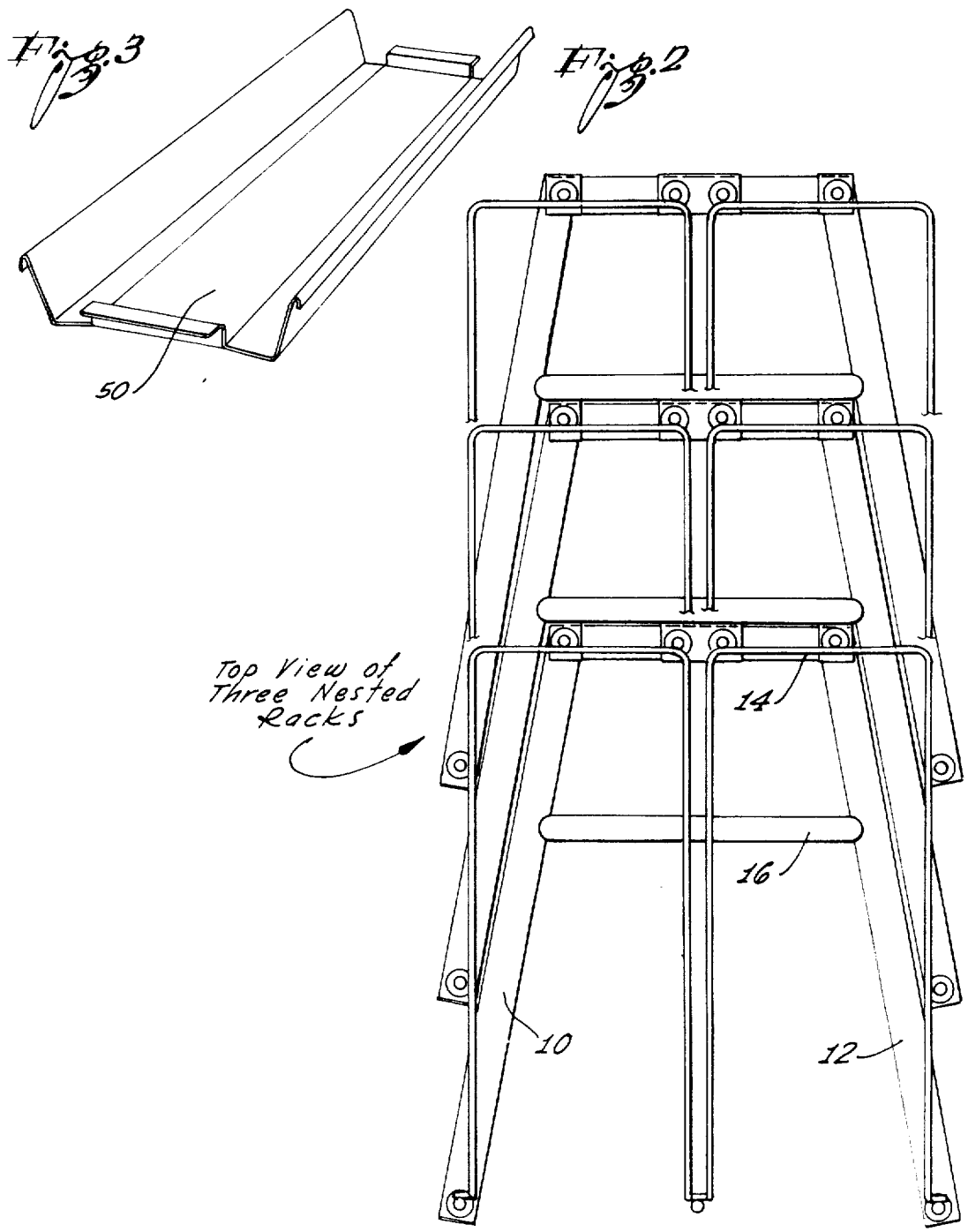
INVENTOR:
James D. Wilson
By Keith D. Beecher
ATTORNEYS

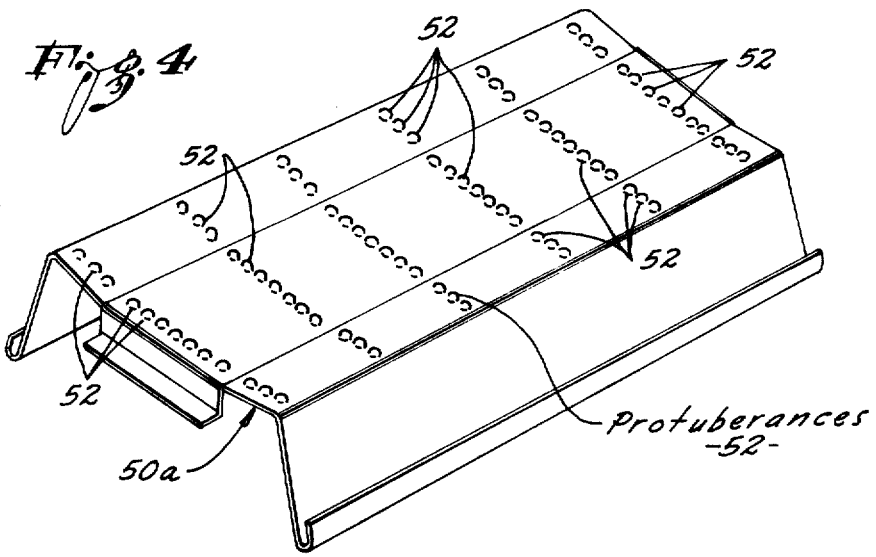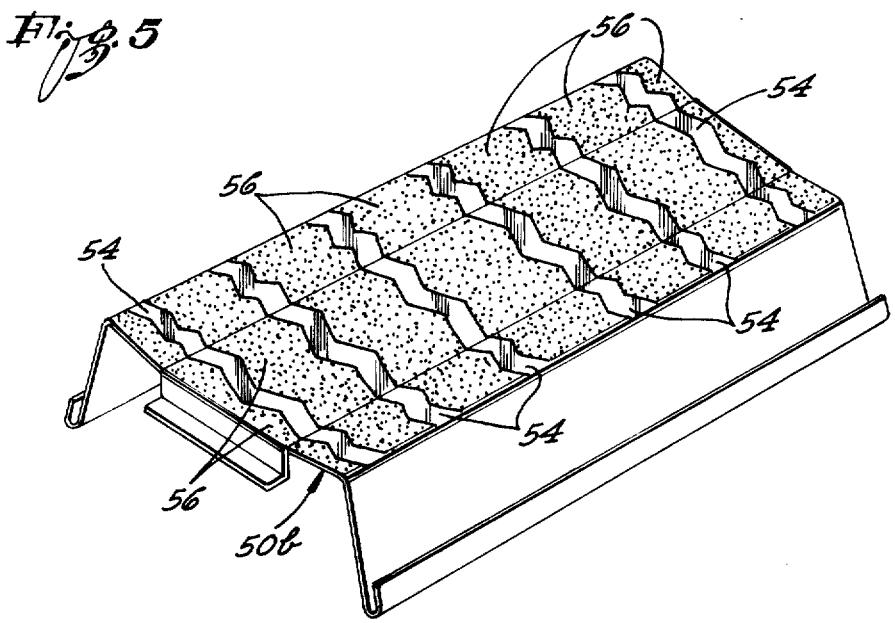

COOKING RACK-PAN COMBINATION

This application is a continuation-in-part of copending application Ser. No. 853,380 filed Aug. 27, 1969, now abandoned in the name of the present inventor.

BACKGROUND OF THE INVENTION

The rack-pan combination of the present invention is intended primarily to be used in the tuna fish industry. Tuna must be pre-cooked before it is canned, and the pre-cooking is usually carried out in a pressure chamber using steam heat. The steam heat has the double effect of cooking the fish, and also of causing fish oils to be produced. The fish oils are used, for example, in the manufacture of vitamin pills, and also in the paint industry. After the tuna has been cooked, it is usual in the canning process for the skin, dark meat, bones and white meat to be hand separated.

In the past, it has been the usual practice to cook the tuna industrially in wire baskets which are supported on large racks, the basket and rack combinations being placed into the cooking ovens. The larger canneries, for example, have many thousands of such prior art rack and basket combinations in use.

However, the usual prior art rack and basket combination of the type described above, are wasteful of space, and also are most difficult to clean. In addition, the use of baskets to support the fish while cooking, has been found to cause a substantial portion of the fish to adhere to the wires of the baskets and to be lost during the subsequent separation process.

The rack-pan combination of the present invention is constructed so that the racks, as mentioned above, may be nested into one another when not in use, so as to conserve floor space in the cannery. In addition, the pans are of an impervious construction, rather than being configured as wire-formed baskets, and they may be made, for example, of stainless steel sheet metal. Release agents, such as palm oil and lecithin, may be used to prevent any sticking of the fish to the surface of the pan. The pans are constructed so that they may also be nested into one another when not in use.

The pans to be described have a crown shaped bottom which defines troughs or gutters at the sides thereof. These troughs gather the fish oils which are produced during the cooking process. The pans are supported within the rack with a slight inclination, so that the fish oils collected in the troughs at each side of the bottom of each pan drains out one end of the pans. The pans are supported so that the fish oils draining out the ends of each pan falls to the bottom of the rack to be collected, and does not drain through the lower pans, as is the case with the prior art baskets. This action has been found to render a greater quantity of oil than the usual prior art baskets, and also to render a cleaner and higher quality end product.

It has been found that the impervious stainless steel metal pans provide adequate heat circulation to the fish being cooked therein, and also provide an adequate means of draining off the oils produced during the cooking process. The use of such pans obviates the prior art practice in the fish industry to use wire baskets, these being thought necessary as the only way to obtain the prior heat circulation to the fish and at the same time to be capable of draining off the oils rendered during the cooking operation. The use of impervious pans, instead of wire baskets, eliminates the "waffle" effect on the fish surface produced by the prior art baskets, and which resulted in the loss of as much as 7 percent of the meat during the canning process.

As will be described, the impervious pans are slidably supported on U-shaped support rails on the rack, the rails being supported on upright posts in a spaced generally horizontal relationship. In the embodiment to be described, the upper edges of the pans are rolled over slidably to engage the corresponding rails, and completely cover the rails. This prevents the fish in the individual pans from actually coming in contact with the rails or any other portion of the rack itself, so that cleaning of the rack is made easier and the need for cleaning the rack is less frequent than in the usual prior art assembly.

BRIEF DESCRIPTION OF THE DRAWINGS

FIG. 2 is a top plan view showing the manner in which a plurality of rack assemblies, each incorporating the concepts of the invention, may be nested into one another to conserve space;

FIG. 3 is a top perspective view of one of the pans used in the rack and pan combination of the invention;

FIG. 4 is a bottom perspective view of a pan like FIG. 3 but modified to provide basting of the fish being cooked; and FIG. 5 is a pan representing yet another modification and also providing basting.

DETAILED DESCRIPTION OF THE ILLUSTRATED EMBODIMENT

Figure 1:
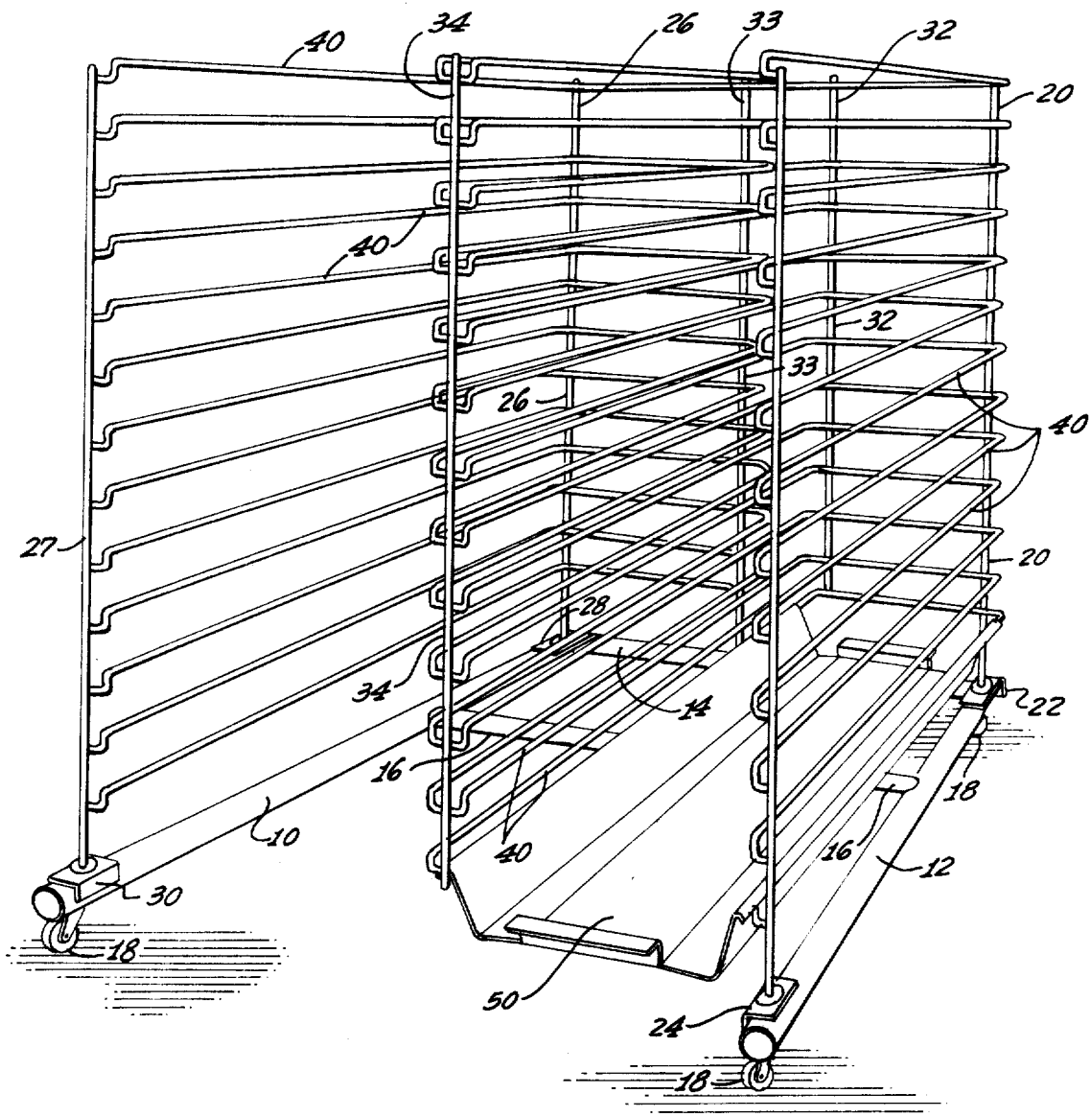
FIG. 1 is a perspective rendition of one embodiment of the improved rack and pan combination of the invention.

The improved rack and pan assembly shown in FIG. 1, for example, includes a lower wheeled carriage which is made up of a pair of side bars 10 and 12, and a rear interconnecting crossbar 14, and an intermediate interconnecting crossbar 16. The lower carriage is supported on casters 18, for example, to permit the rack to be moved freely from place to place. The lower carriage is such that the side bars 10 and 12 are inclined outwardly towards the front of the rack so as to permit other like racks conveniently to be nested against the rack of FIG. 1, as best shown in FIG. 3.

A first pair of upright support posts 20, 21 is supported on a pair of angles 22, 24 which, in turn, are affixed to the side bar 12. A second pair of upright posts 26, 27 is supported on similar angle members 28 and 30 which are affixed to the sie bar 10 of the wheeled carriage. The rack also includes a further pair of rear upright support posts 32, 33 positioned between the corresponding posts 21 and 27 on the crossbar 14, and a common forward post 34 positioned between the posts 21 and 27.

A first plurality of U-shaped support rails 40 are supported by the posts 20, 21, 32, 33 and 34. These U-shaped rails have the illustrated configuration, and they are affixed to their supporting posts to be disposed in essentially horizontal planes one above the other. However, each of the rails is inclined slightly to the horizontal, so that fish oil collected in the pans supported thereby may be drained to one end of the pan.

A second plurality of U-shaped rails 40 is supported in like spaced and parallel horizontal planes by the posts 33, 34, 26 and 27. The U-shaped rails of the second plurality are supported adjacent the U-shaped rails of the first plurality, and it will be observed that the adjacent sides of each corresponding pair of rails in the two pluralities may be made integral, at the point at which the rails are affixed, for example, to the common post 34.

The U-shaped rails 40 define a closed back for the rack, and a open front. The inclination of the individual rails 40 for drainage purposes, as explained above, also permits similar rack assemblies to be nested with a one another in the manner shown in FIG. 2, with the rails of each successive rack assembly extending under the rails of the rack assembly in front of it. A plurality of pans, such as the pan 50 of FIGS. 1 and 3, may be supported, as shelves, on the U-shaped rails 40 in a stacked relationship, to be individually insertable and removable from the front of the rack.

The pans 50 are impervious as mentioned above, and may be constructed of sheet metal stainless steel. Each pan 50 may have the configuration shown in FIGS. 1 and 3 to have open ends, and a crown shaped bottom. The bottom defines troughs at each side thereof which permit oils from the fish to be drained out the open end of the pan, when it is supported with a slight inclination in the rack. The side edges of the pans have a rolled over shape, as shown, so as to permit the pans slidably to be supported on the corresponding rails 40. It will be observed in FIG. 1 that when a pan 50 is supported on a pair of rails 40, the sides of the pan completely cover the corresponding rail, so that the fish itself does not come in contact with the rack which, as mentioned above, facilitates the cleaning process.

The pans themselves are constructed so that when not in use, they may conveniently be nested into one another so that they and the racks occupy a minimum of floor space. It will be appreciated that the pans 50, supported in a slightly inclined manner one on top of the other in the rack of FIG. 1, cause oils rendered during the cooking process and drained from the individual pans to flow out the ends of the pans. The oil is then collected by any appropriate means at the bottom of the rack assembly, and the oil from an upper pan does not flow through the lower pans, as is the case with the prior art cooking baskets, so that a cleaner and higher quality oil product is obtained.

The 50a in FIG. 4 is similar to the pan 50 of FIG. 3, except that it has a multiplicity of protruberances 52 formed on its bottom surface. The protruberances may be formed, for example, by a dimpling operation on the opposite side of the bottom of the pan.

The protruberances 52 cause the steam which is used during the cooking operation to condense and form drops which fall on the contents of the lower pan and which baste the contents with pure distilled water during the cooking process.

A similar effect is achieved by the pan 50b in FIG. 5. However, the latter pan has its bottom surface chemically etched, or otherwise treated, to provide a quilted pattern of dull areas 54 and bright areas 56.

The pans 50b may be supported in the rack of FIG. 1 in a slightly inclined position, so that the steam condensing on the underside of the pan 50b will form droplets at each apex in the bright regions. The droplets will drop on the contents of the lower pan to perform the aforesaid basting action.

It will be appreciated that other configurations of the bottom surfaces of the pans are possible to condense the steam and cause droplets for the aforesaid basting action.

Therefore, while particular embodiments have been shown and described modifications may be made, and it is intended to cover such modifications as come within the spirit and scope of the invention.

What is claimed is:

1. A rack and pan combination including: a plurality of elongated upright post members; a plurality of pairs of support rails affixed to said upright post members and normally disposed in spaced and parallel horizontal planes one above the other, said support rails defining an open front for the rack; and a plurality of impervious metallic pans slidably supported on respective pairs of said rails, and slidable in and out of said rack from the open front thereof, said pans each having a bottom surface configured to form droplets of condensed steam so as to baste the contents of the next lower pan.

2. The combination defined in claim 1, in which said pans each has an open end, and each has a crown-shaped bottom defining troughs at each side of said bottom for draining liquids towards said open end.

3. The combination defined in claim 1, in which said bottom surface is configured into a multiplicity of protuberances.

4. The combination defined in claim 1, in which said pan each has a bottom surface formed in a quilted pattern of bright and dull areas to form droplets of condensed steam so as to baste the contents of the next lower pan.

* * * * *